US008094596B2

(12) United States Patent  
Lee et al.

(10) Patent No.: US 8,094,596 B2  
(45) Date of Patent: Jan. 10, 2012

(54) WIRELESS PERSONAL AREA NETWORK ZIGBEE RECEIVER AND RECEIVING METHOD THEREOF

(75) Inventors: U Sang Lee, Gyunggi-do (KR); Koon Shik Cho, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 728 days.

(21) Appl. No.: 12/176,129

(22) Filed: Jul. 18, 2008

(65) Prior Publication Data

US 2009/0022139 A1 Jan. 22, 2009

(30) Foreign Application Priority Data

Jul. 20, 2007 (KR) ........................ 10-2007-0072795

(51) Int. Cl.
*H04B 7/00* (2006.01)
(52) U.S. Cl. .................... 370/311; 370/350; 370/503
(58) Field of Classification Search .................. 370/311, 370/350, 503–516; 375/140–142, 147, 150

See application file for complete search history.

(56) References Cited

U.S. PATENT DOCUMENTS

| 2007/0002937 A1 | 1/2007 | Min et al. |
| 2007/0104297 A1* | 5/2007 | Gorday .......................... 375/150 |
| 2010/0002812 A1* | 1/2010 | Steele et al. .................. 375/343 |

* cited by examiner

*Primary Examiner* — Pao Sinkantarakorn
(74) *Attorney, Agent, or Firm* — Lowe, Hauptman, Ham & Berner, LLP

(57) ABSTRACT

There are provided a wireless personal area networks (WPAN) Zigbee receiver and a receiving method thereof that can obtain a spreading gain by a reduction in data rate. A wireless personal area network Zigbee receiver receiving a signal packet including a plurality of functional units having a plurality of symbols, the plurality of functional units each repeated as many as a predetermined extension number according to an aspect of the invention includes: a preamble detection unit detecting a, and generating a preamble synchronization; and an SFD synchronization unit comparing, each symbol of SFD units included in the signal packet with a predetermined SFD reference symbol continuously and repeatedly as many as the extension number, and generating an SFD synchronization signal when each of the symbols of the SFD units is equal to the SFD reference symbol as many as the extension number.

12 Claims, 3 Drawing Sheets

| OCTETS (OCTERS) 4 | 1 | 1 | VARIABLE |
|---|---|---|---|
| PREAMBLE | SFD | PREAMBLE LENGTH (7 bits) / RESERVED (1 bits) | DATA (PSDU) |
| SHR | | PHR | PHY PAYLOAD |

FIG. 2

WIRELESS PERSONAL AREA NETWORK ZIGBEE RECEIVER AND RECEIVING METHOD THEREOF

CROSS-REFERENCE TO RELATED APPLICATIONS

This application claims the priority of Korean Patent Application No. 2007-0072795 filed on Jul. 20, 2007, in the Korean Intellectual Property Office, the disclosure of which is incorporated herein by reference.

BACKGROUND OF THE INVENTION

1. Field of the Invention

The present invention relates to a wireless personal area network (WPAN) Zigbee receiver and a receiving method thereof, and more particularly, to a wireless personal area networks (WPAN) Zigbee receiver and a receiving method thereof that can maintain compatibility with the existing Zigbee signal packet and modem structure and obtain a spreading gain by a reduction in data rate to significantly improve receive sensitivity.

2. Description of the Related Art

In general, among wireless personal area networks (WPANs), an improvement in receive sensitivity is the most important specification for the chipset development of Zigbee based on the IEEE 802.15.4 standard since the improved receive sensitivity enables to maintain excellent protection against an interference signal in the same channel. Therefore, an effort to improve the receive sensitivity has been made in accordance with the existing Zigbee standard.

The existing wireless personal area network Zigbee receiver detects synchronization by using a preamble of a signal packet and detects symbols with respect to data of a payload following the preamble.

However, when the existing WPANs Zigbee receiver receives the signal packet and restores data, if the received signal strength is low or there are strong interference radio waves, loss or modification may occur in the transmitted signal packet.

In order to prevent a reduction in receive sensitivity, automatic gain control of a received signal is performed in a physical layer. Therefore, it is still difficult to observe the improvement in receive sensitivity in an actual network environment. There has been a need for a more reliable method of improving receive sensitivity.

SUMMARY OF THE INVENTION

An aspect of the present invention provides a wireless personal area network receiver and a receiving method thereof that can maintain compatibility with the existing Zigbee signal packet and modem structure and obtain a spreading gain by a reduction in data rate to significantly improve receive sensitivity.

According to an aspect of the present invention, there is provided a wireless personal area network Zigbee receiver receiving a signal packet including a plurality of functional units having a plurality of symbols, the plurality of functional units each repeated as many as a predetermined extension number, the wireless personal area network Zigbee receiver including: a preamble detection unit correlating a preamble reference symbol with each of the symbols of the plurality of functional units of the signal packet continuously and repeatedly as many as the extension number to obtain and accumulate correlation values, detecting a preamble by using a cumulative correlation value obtained by accumulating the correlation values, and generating a preamble synchronization signal if the extension number is previously determined; and an SFD synchronization unit comparing, when the preamble synchronization signal is input, each symbol of SFD units included in the signal packet with a predetermined SFD reference symbol continuously and repeatedly as many as the extension number, and generating an SFD synchronization signal when each of the symbols of the SFD units is equal to the SFD reference symbol as many as the extension number.

The signal packet may further include a data unit having a plurality of symbols.

The wireless personal area network Zigbee receiver may further include a symbol detection unit correlating, when the SFD synchronization signal is input from the SFD synchronization unit, symbols of data units following the SFD units of the signal packet with each of a plurality of reference symbols continuously and repeatedly as many as the extension number to obtain correlation values, accumulating the correlation values according to each of the reference symbols to obtain cumulative correlation values, and detecting a symbol having the largest cumulative correlation value if the extension number is previously determined.

The signal packet may further include a reserved unit and a frame length unit having a plurality of symbols.

If the extension number is not previously determined, the preamble detection unit may correlate each of the symbols of the plurality of functional units of the signal packet with the reference symbol to obtain correlation values, detect a preamble by using the correlation values, and detect a preamble synchronization signal.

When the preamble synchronization signal is input from the preamble detection unit, if the extension number is not previously determined, the SFD synchronization unit may compare each of the symbols of the SFD unit included in the signal packet with the determined SFD reference symbol, and generate an SFD synchronization signal when each of the symbols of the SFD unit is equal to the SFD reference symbol.

When the SFD synchronization signal is input from the SFD synchronization unit, if the extension number is not previously determined, the symbol detection unit may correlate the symbols of the data unit following the SFD unit of the signal packet with each of the plurality of reference signals to obtain correlation values, and detect a symbol having the largest correlation values among the plurality of reference symbols having the correlation values.

According to an aspect of the present invention, there is provided a receiving method of a wireless personal area network Zigbee receiver receiving a signal packet including a plurality of functional units having a plurality of symbols, the plurality of functional units each repeated as many as a predetermined extension number, the receiving method including: correlating a preamble reference symbol with each of the symbols of the plurality of functional units of the signal packet continuously and repeatedly as many as the extension number to obtain and accumulate correlation values, detecting a preamble by using a cumulative correlation value obtained by accumulating the correlation values, and generating a preamble synchronization signal if the extension number is previously determined (preamble detecting operation); and comparing each symbol of SFD units included in the signal packet with a predetermined SFD reference symbol continuously and repeatedly as many as the extension number when the preamble synchronization signal is detected, and generating an SFD synchronization signal when each of the symbols of the SFD units is equal to the SFD reference symbol as many as the extension number (SFD detecting operation).

The signal packet may further include a data unit having a plurality of symbols.

The receiving method further include correlating symbols of data units following the SFD units of the signal packet with each of a plurality of reference symbols continuously and repeatedly as many as the extension number to obtain correlation values when the SFD synchronization signal is detected, accumulating the correlation values according to each of the plurality of reference symbols to obtain cumulative correlation values, and detecting a symbol having the largest cumulative correlation value (symbol detecting operation).

The signal packet may further include a reserved unit and a frame length unit having a plurality of symbols.

The receiving method may further include performing the preamble detecting operation, the SFD detecting operation, and the symbol detecting operation repeatedly before the end (repetition operation).

In the preamble detecting operation, if the extension number is not determined previously, each of the symbols of the plurality of functional units of the signal packet may be correlated with the preamble reference symbol to obtain correlation values, a preamble may be detected by using the correlation values, and a preamble synchronization signal may be generated.

In the SFD detecting operation, when the preamble synchronization signal is detected, if the extension number is not determined previously, each of the symbols of the SFD unit included in the signal packet may be compared with the predetermined SFD reference symbol, and an SFD synchronization signal may be generated when each of the symbols of the SFD unit is equal to the SFD reference symbol.

In the symbol detecting operation, the symbols of the data unit following the SFD unit of the signal packet may be correlated with each of the plurality of reference signals to obtain correlation values, the correlation values may be accumulated according to the plurality of reference symbols to obtain cumulative correlation values, and a symbol having the largest cumulative correlation value may be detected.

The receiving method may further include performing the preamble detecting operation, the SFD detecting operation, and the symbol detecting operation repeatedly before the end (repetition operation).

BRIEF DESCRIPTION OF THE DRAWINGS

The above and other aspects, features and other advantages of the present invention will be more clearly understood from the following detailed description taken in conjunction with the accompanying drawings, in which:

FIG. 2 is a view illustrating of a signal packet structure of a wireless personal area network Zigbee system that is applied to the present invention.

DETAILED DESCRIPTION OF THE PREFERRED EMBODIMENT

Figure 1:
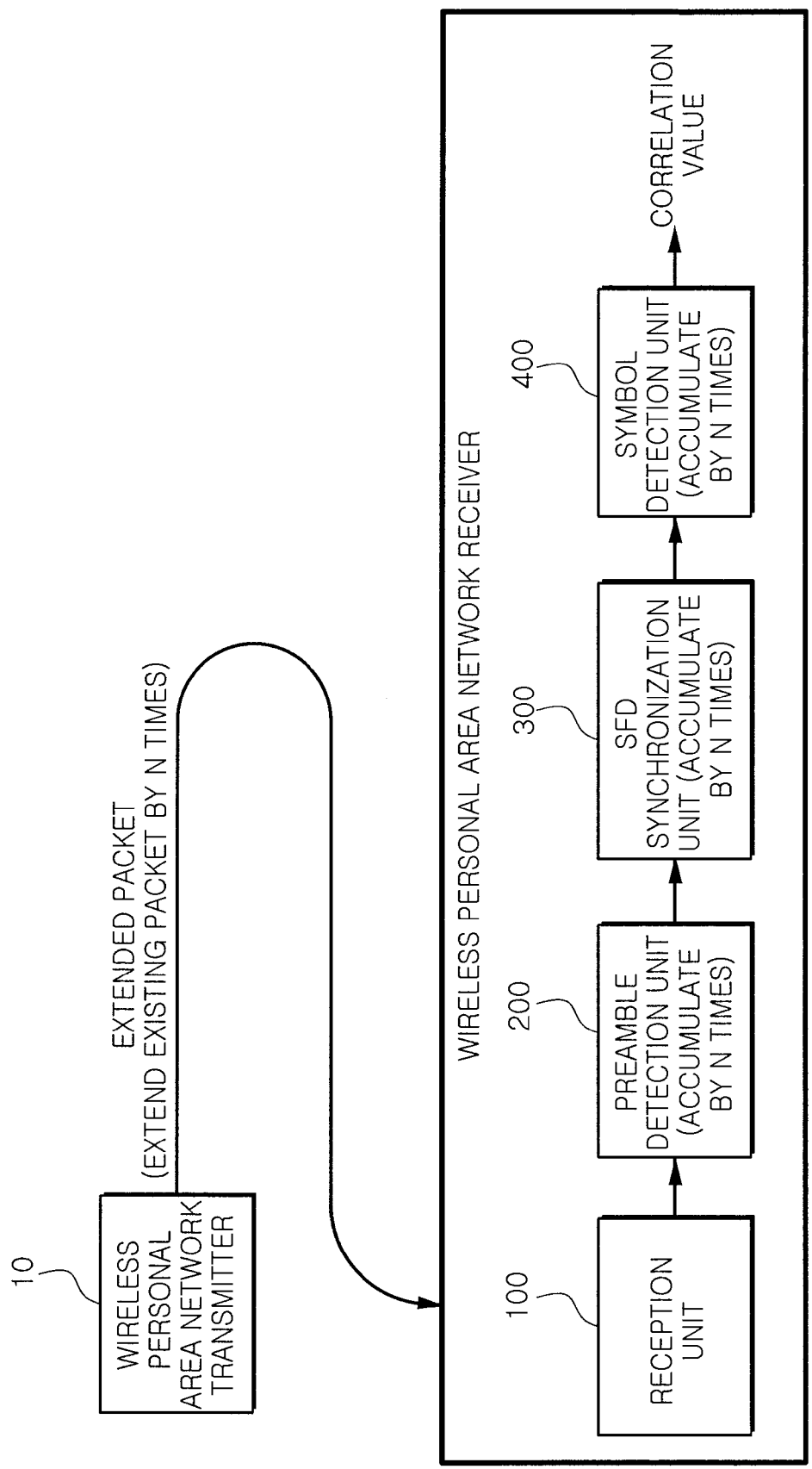
FIG. 1 is a configuration view illustrating a wireless personal area network Zigbee system according to an exemplary embodiment of the present invention.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. Also, in the drawings, the same reference numerals are used throughout to designate the same components.

FIG. 1 is a configuration view illustrating a wireless personal area network Zigbee system according to an exemplary embodiment of the invention.

Referring to FIG. 1, the wireless personal area network Zigbee system according to the embodiment of the invention includes a wireless personal area network transmitter 10 and a wireless personal area network receiver 20.

The wireless personal area network transmitter 10 transmits a signal packet that includes a plurality of functional units having a plurality of symbols. In the signal packet, each of the plurality of functional units is repeated as many as a predetermined extension number. The wireless personal area network receiver 20 receives the signal packet that includes the plurality of functional units having the plurality of symbols. In the signal packet, each of the plurality of functional units is repeated by the predetermined extension number.

More specifically, the wireless personal area network receiver 20 includes a reception unit 100, a preamble detection unit 200, and an SFD synchronization unit 300. The reception unit 100 receives the signal packet from the wireless personal area network transmitter 10. When the extension number is previously determined, the preamble detection unit 200 correlates each of the symbols of the plurality of functional units of the signal packet, received by the reception unit 100, with a preamble reference symbol continuously and repeatedly as many as the extension number to obtain and accumulate correlation values, detects a preamble by using a cumulative correlation value obtained by accumulating the correlation values, and generates a preamble synchronization signal. When the preamble synchronization signal is input from the preamble detection unit 200, if the extension number is previously determined, the SFD synchronization unit 300 compares each symbol of SFD units of the signal packet with a predetermined SFD reference symbol continuously and repeatedly as many as the extension number and generates an SFD synchronization signal if each of the symbols of the SFD units is equal to the predetermined SFD reference symbol as many as the extension number.

FIG. 2 is a view illustrating a signal packet structure of a wireless personal area network Zigbee system that is applied to the present invention.

Referring to FIG. 2, the signal packet may further include a frame length unit having a plurality of symbols, a reserved unit, and a data unit having a plurality of symbols as well as the described preamble unit and SFD unit.

Referring to FIGS. 1 and 2, the wireless personal area network receiver 20 may further include a symbol detection unit 400. When the SFD synchronization signal is input from the SFD synchronization unit 300, if the extension number is previously determined, the symbol detection unit 400 correlates symbols of data units following the SFD units of the signal packet with each of a plurality of reference symbols continuously and repeatedly by the extension number to obtain correlation values, accumulates the correlation values according to each of the plurality of reference symbols to obtain cumulative correlation values, and detects a symbol having the largest cumulative correlation value.

Here, the extension number may be determined as two or more. If the extension number is increased, the receive sensitivity can be improved but a data rate is correspondingly reduced. Therefore, the extension number needs to be determined in consideration of an environment of an actual application system, data transmission requirements, and receive sensitivity requirements.

For example, when the extension number is two, each of the plurality of functional units of the signal packet, shown in FIG. 2, is extended twice. That is, the preamble unit is successively repeated twice, the SFD unit is successively repeated twice, the frame length unit is successively repeated twice, and the data unit is successively repeated twice, thereby constructing the signal packet.

Further, a signal packet to receive can be set to an extended signal packet or not. When the signal packet to receive is set to a signal packet that is not extended, the wireless personal area network receiver 20 according to the embodiment of the invention can receive the existing signal packet that is not extended.

That is, when the extension number is not previously determined, the preamble detection unit 200 correlates the symbols of each of the plurality of functional unit with the preamble reference symbol to obtain correlation values, detects a preamble by using the correlation values, and generates a preamble synchronization signal.

Further, when the preamble synchronization signal is input from the preamble detection unit 200, if the extension number is not previously determined, the SFD synchronization unit 300 compares each of the symbols of the SFD unit included in the signal packet with the predetermined SFD reference to obtain correlation values, and generates an SFD synchronization signal if each of the symbols of the SFD unit is equal to the predetermined SFD reference symbol.

Then, when the SFD synchronization signal is input from the SFD synchronization unit 300, if the extension number is not previously determined, the symbol detection unit 400 correlates the symbols of the data unit following the SFD unit of the signal packet with each of the plurality of reference symbols to obtain correlation values, and detects a reference symbol having the largest correction value among the plurality of correlation values.

Figure 3:
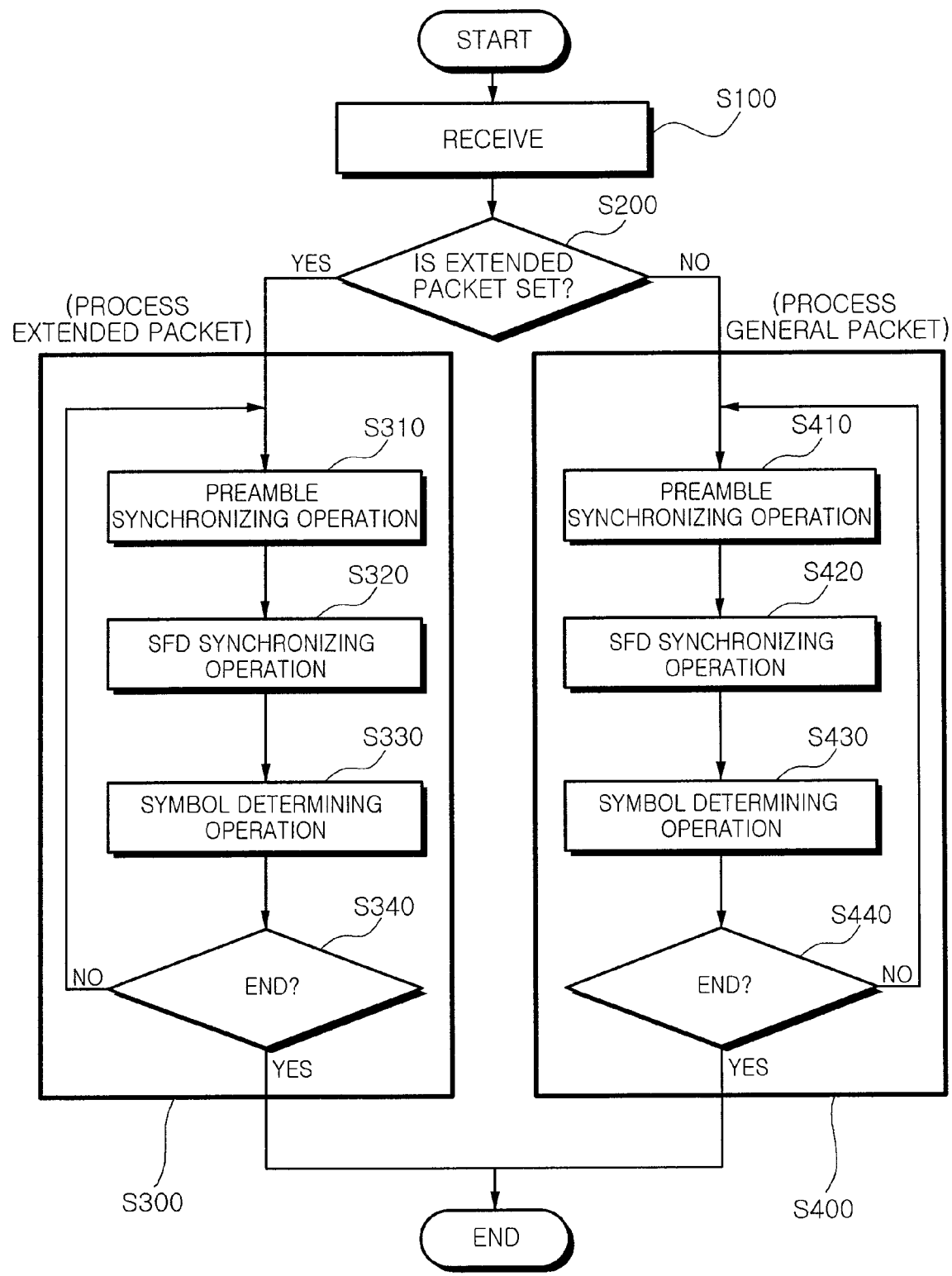
FIG. 3 is a flowchart illustrating a receiving method of the wireless personal area network Zigbee system according to another exemplary embodiment of the present invention.

FIG. 3 is a flowchart illustrating a receiving method of the wireless personal area network receiver according to another exemplary embodiment of the present invention. In FIG. 3, in Operation S100, a signal packet is received. In operation S200, it is determined whether the received signal packet is processed as an extended packet or a general packet that is not an extended packet.

In operation S310, a preamble is detected. When an extension number is previously determined, each symbol of a plurality of functional units of the signal packet is correlated with a preamble reference symbol continuously and repeatedly as many as the extension number to obtain and accumulate correlation values, the preamble is detected by using a cumulative correlation value obtained by accumulating the correlation values, and a preamble synchronization signal is generated.

In operation S320, an SFD is detected. When the preamble synchronization signal is detected, if the extension number is previously determined, each symbol of SFD units included in the signal packet is compared with a predetermined SFD reference symbol continuously and repeatedly as many as the extension number, and an SFD synchronization signal is generated when each of the symbols of the SFD units is equal to the SFD reference symbol as many as the extension number.

In operation S330, a symbol is detected. When the SFD synchronization signal is detected, if the extension number is previously determined, symbols of data units following the SFD units of the signal packet are correlated with each of a plurality of reference symbols continuously and repeatedly as many as the extension number to obtain and accumulate correlation values, the correlation values are accumulated according to each of the plurality of reference symbols to obtain cumulative correlation values, and a symbol having the largest cumulative correlation value is detected.

In Operation S340, repetition is performed. Before the end, the preamble detecting operation (S310), the SFD detecting operation (S320), and the symbol detecting operation (S330) are repeatedly performed.

Further, in Operation S410, a preamble is detected. When the extension number is not previously, each of the symbols of the plurality of functional units of the signal packet is correlated with the preamble reference symbol continuously and repeatedly as many as the extension number to obtain and accumulate correlation values, a preamble is detected by using a cumulative correlation value obtained by accumulating the correlation values, and a preamble synchronization signal is generated.

In Operation S420, an SFD is detected. When the preamble synchronization signal is detected, if the extension number is not previously determined, each of the symbols of the SFD unit included in the signal packet is compared with the predetermined SFD reference symbol, and an SFD synchronization signal is generated when ach of the symbols of the SFD unit is equal to the SFD reference symbol.

In Operation S430, a symbol is detected. When the SFD synchronization signal is detected, if the extension number is not previously determined, the symbols of the data unit following the SFD unit of the signal packet are compared with each of the plurality of reference symbols repeatedly to obtain correlation values, the correlation values are accumulated according to each of the plurality of reference symbols to obtain cumulative correlation values, and a symbol having the largest cumulative correlation value is detected.

In Operation S440, repetition is performed. Before the end, the preamble detecting operation S410, the SFD detecting operation S420, and the symbol detecting operation S430 are repeatedly performed.

Hereinafter, the operation and effect of the present invention will be described in detail with reference to the accompanying drawings.

Referring to FIGS. 1 to 3, the wireless personal area network receiver and the receiving method thereof according to exemplary embodiments of the invention will be described. In FIG. 1, the wireless personal area network Zigbee system according to the embodiment of the invention includes the wireless personal area network transmitter 10 and the wireless personal area network receiver 20.

First, the wireless personal area network transmitter 10 may transmit a signal packet that includes a plurality of functional units. In the signal packet, each of the plurality of functional units is repeated by a predetermined extension number. Here, when data to be transmitted is divided into every four bits, a symbol includes 32 chip signals that are previously stored in a four-bit address.

Here, the wireless personal area network receiver 20 may the signal packet that includes the plurality of functional units. In the signal packet, each of the plurality of functional units is repeated by the predetermined extension number.

Further, as shown in FIG. 2, the signal packet may include a preamble unit, an SFD unit, a frame length unit, a reserved unit, and a data unit.

Referring to FIGS. 1 and 2, the wireless personal area network receiver will be described in more detail.

In FIG. 1, when the wireless personal area network receiver 20 includes the reception unit 100, the preamble detection unit 200, the SFD synchronization unit 300, and the symbol detection unit 400, the reception unit 100 receives the signal packet from the wireless personal area network transmitter 10.

When the extension number is previously determined, the preamble detection unit 200 correlates each of the symbols of the plurality of functional units of the signal packet received by the reception unit 100 with the preamble reference symbol continuously and repeatedly as many as the extension number to obtain and accumulate correlation values, detects a preamble by using a cumulative correlation value obtained by accumulating the correlation values, and generates a preamble synchronization signal.

Then, when the preamble synchronization signal is input from the preamble detection unit 200, if the extension number is previously determined, the SFD synchronization unit 300 compares each of the symbols of the SFD units included in the signal packet with the predetermined SFD reference symbol continuously and repeatedly as many as the extension number, and generates an SFD synchronization signal when each of the symbols of the SFD units is equal to the SFD reference symbol as many as the extension number.

When the SFD synchronization signal is input from the SFD synchronization unit 300, if the extension number is previously determined, the symbol detection unit 400 correlates the symbols of the data units following the SFD units of the signal packet with each of the plurality of reference symbols continuously and repeatedly as many as the extension number to obtain correlation values, accumulates the correlation values according to each of the plurality of reference symbols to obtain cumulative correlation values, and detects a symbol having the largest cumulative correlation value.

Here, the extension number may be two or more. When the extension number is increased, the receive sensitivity can be improved but a data rate is correspondingly reduced. Therefore, preferably, in consideration of an environment of an actual application system, data transmission requirements, and receive sensitivity requirements, the extension number is determined to satisfy the data rate.

For example, when the extension number is 2, each of the plurality of functional units of the signal packet, described in FIG. 2, is extended twice. That is, the preamble unit is repeated twice, the SFD unit is repeated twice, the frame length unit is repeated twice, the reserved unit is repeated twice, and the data unit is repeated twice, thereby constructing the signal packet.

Further, a signal packet to receive can be set to an extended signal packet or not. When the signal packet to receive is set to a signal packet that is not extended, the wireless personal area network receiver 20 according to the embodiment of the invention can receive the existing signal packet that is not extended. Here, each of the preamble detection unit 200, the SFD synchronization unit 300, and the symbol detection unit 400 does not accumulate the correlation values.

That is, referring to FIGS. 1 and 2, when the extension number is not determined previously, the preamble detection unit 200 compares each of the symbols of the plurality of functional units of the signal packet with the preamble reference symbol continuously and repeatedly as many as the extension number to obtain correlation values, detects a preamble by using the correlation values, and generates a preamble synchronization signal.

Further, when the preamble synchronization signal is input from the preamble detection unit 200, if the extension number is not determined previously, the SFD synchronization unit 300 compares each of the symbols of the SFD unit included in the signal packet with the predetermined SFD reference symbol, and generates an SFD synchronization signal when each of the symbols of the SFD unit is equal to the predetermined SFD reference symbol.

Then, when the SFD synchronization signal is input from the SFD synchronization unit 300, if the extension number is not determined previously, the symbol detection unit 400 correlates the symbols of the data unit following the SFD unit of the signal packet with each of the plurality of reference symbols to obtain correlation values, and detects a reference symbol having the largest correlation value among the correlation values of the plurality of reference symbols.

A receiving method of the wireless personal area network receiver according to another exemplary embodiment of the invention will be described with reference to FIGS. 1 to 3.

FIG. 3 is a flowchart illustrating a receiving method of the wireless personal area network receiver according to another exemplary embodiment of the invention. Referring to FIGS. 1 to 3, in the receiving method of the wireless personal area network receiver, a signal packet is received in Operation S100, and in Operation S200, it is determined whether the received signal packet is processed as an extended packet or a general packet that is not the extended packet.

When the signal packet is determined as the extended packet, the extended packet is processed in Operation S300. The extended packet is processed as follows.

First, in the preamble detecting operation, if the extension number is previously determined, each symbol of the plurality of functional units of the signal packet is compared with a preamble reference symbol continuously and repeatedly as many as the extension number to obtain and accumulate correlation values, the preamble is detected by using a cumulative correlation value obtained by accumulating the correlation values, and a preamble synchronization signal is generated (Operation S310 of FIG. 3).

Then, in the SFD detecting operation, when the preamble synchronization signal is detected, if the extension number is determined, each symbol of SFD units included in the signal packet is compared with a predetermined SFD reference symbol continuously as many as the extension number, and generates an SFD synchronization signal when each of the symbols of the SFD unit is equal to the SFD reference symbol as many as the extension number (Operation S320 of FIG. 3).

Then, in the symbol detecting operation, when the SFD synchronization signal is detected, if the extension number is previously determined, symbols of data units following the SFD units included in the signal packet is correlated with each of a plurality of reference symbols repeatedly and continuously as many as the extension number to obtain correlation values, the correlation values are accumulated according to each of the plurality of reference values to obtain cumulative correlation values, and a symbol having the largest cumulative correlation value is detected (Operation S330 of FIG. 3).

Further, in the repetition operation, before the end, the preamble detecting operation S310, the SFD detecting operation S320, and the symbol detecting operation S330 are repeatedly performed (Operation S340 of FIG. 3).

When the signal packet is determined as the general packet, not the extended packet, the general packet is processed in Operation S400. The general packet processing operation is performed as follows.

First, in the preamble detecting operation S410, if the extension number is not determined previously, each of the symbols of the plurality of functional units of the signal packet is correlated with the preamble reference symbol to obtain correlation values, a preamble is detected by using the correlation values, and a preamble synchronization signal is generated.

Then, in the SFD detecting operation S420, when the preamble synchronization signal is detected, if the extension number is not determined previously, each of the symbols of the SFD unit included in the signal packet is compared with the predetermined SFD reference symbol, and an SFD synchronization signal is generated when each of the symbols of the SFD unit is equal to the SFD reference symbol.

Then, in the symbol detecting operation S430, when the SFD synchronization signal is detected, the symbols of the data unit following the SFD unit of the signal packet are compared with each of the reference symbols to obtain correlation values, the correlation values are accumulated according to each of the plurality of reference symbols to obtain cumulative correlation values, and a symbol having the largest cumulative correlation value is detected.

Then, in the repetition operation S440, before the end, the preamble detecting operation S410, the SFD detecting operation S420, and the symbol detecting operation S430 are repeatedly performed.

As described above, when the extension number is not determined, the existing system and packet can be directly used, thereby maintaining compatibility with the existing system and packet. When the extension number is determined, correlation values are accumulated by the determined extension number, and the correlation values are accumulated, such that the preamble, the SFD, and the symbol are detected on the basis of the accumulated correlation values. Therefore, receive sensitivity can be significantly increased despite the reduction in data rate.

As set forth above, according to the exemplary embodiments of the invention, in the wireless personal area network (WPAN) Zigbee receiver based on IEEE 802.15.4 standard and the receiving method thereof, compatibility with the existing Zigbee signal packet and modem structure is maintained, and a spreading gain can be obtained by a reduction in data rate, thereby significantly improving receive sensitivity.

While the present invention has been shown and described in connection with the exemplary embodiments, it will be apparent to those skilled in the art that modifications and variations can be made without departing from the spirit and scope of the invention as defined by the appended claims.

What is claimed is:

1. A wireless personal area network Zigbee receiver receiving a signal packet including a plurality of functional units having a plurality of symbols, the wireless personal area network Zigbee receiver comprising:
a preamble detection unit for, if an extension number is predetermined, correlating a preamble reference symbol with each of the symbols of the plurality of functional units of the signal packet, the plurality of functional units each being repeated as many as the predetermined extension number, continuously and repeatedly as many as the predetermined extension number to obtain and accumulate correlation values, detecting a preamble by using a cumulative correlation value obtained by accumulating the correlation values, and generating a preamble synchronization signal;
a start of frame delimiter (SFD) synchronization unit for, if the extension number is predetermined, comparing, when the preamble synchronization signal is input, each symbol of SFD unit included in the signal packet with a predetermined SFD reference symbol continuously and repeatedly as many as the predetermined extension number, and generating an SFD synchronization signal when each of the symbols of the SFD unit is equal to the predetermined SFD reference symbol as many as the predetermined extension number; and
a symbol detection unit for, if the extension number is predetermined, correlating, when the SFD synchronization signal is input from the SFD synchronization unit, symbols of data unit following the SFD unit of the signal packet with each of a plurality of reference symbols continuously and repeatedly as many as the predetermined extension number to obtain correlation values, accumulating the correlation values according to each of the reference symbols to obtain cumulative correlation values, and detecting a symbol having a largest cumulative correlation value,
wherein the signal packet further includes the data unit having the symbols.

2. The wireless personal area network Zigbee receiver of claim 1, wherein the signal packet further comprises a reserved unit and a frame length unit having a plurality of symbols.

3. The wireless personal area network Zigbee receiver of claim 1, wherein, if the extension number is not predetermined, the preamble detection unit correlates each of the symbols of the plurality of functional units of the signal packet with the preamble reference symbol to obtain correlation values, detects a preamble by using the correlation values, and detects a preamble synchronization signal.

4. The wireless personal area network Zigbee receiver of claim 3, wherein, if the extension number is not predetermined, the SFD synchronization unit compares each of the symbols of the SFD unit included in the signal packet with the predetermined SFD reference symbol when the preamble synchronization signal is input from the preamble detection unit, and generates an SFD synchronization signal when each of the symbols of the SFD unit is equal to the predetermined SFD reference symbol.

5. The wireless personal area network Zigbee receiver of claim 4, wherein, if the extension number is not predetermined, the symbol detection unit correlates the symbols of the data unit following the SFD unit of the signal packet with each of the plurality of reference signals to obtain correlation values when the SFD synchronization signal is input from the SFD synchronization unit, and detects a symbol having a largest correlation value among the plurality of correlation values of the reference symbols.

6. A receiving method of a wireless personal area network Zigbee receiver receiving a signal packet including a plurality of functional units having a plurality of symbols, the receiving method comprising:
if an extension number is predetermined, correlating a preamble reference symbol with each of the symbols of the plurality of functional units of the signal packet, the plurality of functional units each being repeated as many as the predetermined extension number, continuously and repeatedly as many as the predetermined extension number to obtain and accumulate correlation values, detecting a preamble by using a cumulative correlation value obtained by accumulating the correlation values, and generating a preamble synchronization signal (a preamble detecting operation);
if the extension number is predetermined, comparing each symbol of SFD unit included in the signal packet with a predetermined SFD reference symbol continuously and repeatedly as many as the predetermined extension number when the preamble synchronization signal is detected, and generating an SFD synchronization signal when each of the symbols of the SFD unit is equal to the predetermined SFD reference symbol as many as the predetermined extension number (an SFD detecting operation), and if the extension number is predetermined, correlating symbols of data unit following the SFD unit of the signal packet with each of a plurality of reference symbols continuously and repeatedly as many as the predetermined extension number to obtain correlation values when the SFD synchronization signal is detected, accumulating the correlation values according to each of the plurality of reference symbols to obtain cumulative correlation values, and detecting a symbol having a largest cumulative correlation value (a symbol detecting operation), wherein the signal packet further includes the data unit having the symbols.

7. The receiving method of claim 6, wherein the signal packet further comprises a reserved unit and a frame length unit having a plurality of symbols.

8. The receiving method of claim 6, wherein the preamble detecting operation, the SFD detecting operation, and the symbol detecting operation are repeatedly performed.

9. The receiving method of claim 6, wherein, in the preamble detecting operation, if the extension number is not predetermined, each of the symbols of the plurality of functional units of the signal packet is correlated with the preamble reference symbol to obtain correlation values, a preamble is detected by using the correlation values, and a preamble synchronization signal is generated.

10. The receiving method of claim 9, wherein, in the SFD detecting operation, when the preamble synchronization signal is detected, if the extension number is not predetermined, each of the symbols of the SFD unit included in the signal packet is compared with the predetermined SFD reference symbol, and an SFD synchronization signal is generated when each of the symbols of the SFD unit is equal to the SFD reference symbol.

11. The receiving method of claim 10, wherein, in the symbol detecting operation, the symbols of the data unit following the SFD unit of the signal packet are correlated with each of the plurality of reference signals to obtain correlation values, the correlation values are accumulated according to the plurality of reference symbols to obtain cumulative correlation values, and a symbol having the largest cumulative correlation value is detected.

12. The receiving method of claim 11, wherein the preamble detecting operation, the SFD detecting operation, and the symbol detecting operation are repeatedly performed.

* * * * *